(12) United States Patent
Gutman et al.

(10) Patent No.: US 8,451,719 B2
(45) Date of Patent: May 28, 2013

(54) VIDEO STREAM ADMISSION

(75) Inventors: Ron Gutman, San Diego, CA (US);
Doron Segev, Tel-Aviv (IL); Lorenzo Bombelli, Del Mar, CA (US); Jamie T. Howard, San Diego, CA (US)

(73) Assignee: Imagine Communications Ltd., Netanya (IL)

( * ) Notice: Subject to any disclaimer, the term of this patent is extended or adjusted under 35 U.S.C. 154(b) by 313 days.

(21) Appl. No.: 12/454,412

(22) Filed: May 18, 2009

(65) Prior Publication Data

US 2009/0285092 A1    Nov. 19, 2009

Related U.S. Application Data

(63) Continuation-in-part of application No. 12/152,814, filed on May 16, 2008.

(60) Provisional application No. 61/164,534, filed on Mar. 30, 2009.

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/28* | (2006.01) | |
| *H04L 12/56* | (2006.01) | |

(52) U.S. Cl.
USPC ................................ 370/229; 370/395.4

(58) Field of Classification Search
None
See application file for complete search history.

(56) References Cited

U.S. PATENT DOCUMENTS

| | | | |
|---|---|---|---|
| 5,067,015 A | 11/1991 | Combridge et al. | |
| 5,335,222 A | 8/1994 | Kamoi et al. | |
| 5,848,057 A | 12/1998 | Lee et al. | |
| 6,192,083 B1 | 2/2001 | Linzer et al. | |
| 6,269,078 B1 | 7/2001 | Lakshman et al. | |
| 6,404,738 B1 * | 6/2002 | Reininger et al. | 370/236 |
| 6,571,016 B1 | 5/2003 | Mehrotra et al. | |
| 6,608,832 B2 * | 8/2003 | Forslow | 370/353 |
| 6,788,740 B1 | 9/2004 | Van Der Schaar et al. | |
| 7,130,349 B1 | 10/2006 | Yang | |
| 7,149,185 B1 | 12/2006 | Suni | |
| 7,231,183 B2 * | 6/2007 | Pauli et al. | 455/67.11 |
| 7,340,394 B2 | 3/2008 | Chen et al. | |
| 7,369,490 B2 | 5/2008 | Azami et al. | |

(Continued)

FOREIGN PATENT DOCUMENTS

WO    WO 00/38378    6/2000

OTHER PUBLICATIONS

U.S. Appl. No. 12/152,814 Office Action dated Nov. 23, 2011.
U.S. Appl. No. 12/152,814 Office Action dated May 11, 2012.

*Primary Examiner* — Xavier Szewai Wong
(74) *Attorney, Agent, or Firm* — D. Kligler I.P. Services Ltd.

(57) ABSTRACT

A video stream admission method including receiving one or more parameters of a video stream, indicative of a required bandwidth for the video stream, in a plurality of different quality levels and determining based on the received one or more parameters, whether a channel can meet a predetermined condition for each of the plurality of quality levels, according to an available bandwidth of the channel.

7 Claims, 2 Drawing Sheets

U.S. PATENT DOCUMENTS

| | | | |
|---|---|---|---|
| 7,385,920 B2 * | 6/2008 | Zhang et al. | 370/229 |
| 7,400,630 B1 * | 7/2008 | Ji et al. | 370/395.21 |
| 7,725,109 B2 * | 5/2010 | Kim et al. | 455/450 |
| 7,936,818 B2 | 5/2011 | Jayant et al. | |
| 2002/0025001 A1 | 2/2002 | Ismaeli et al. | |
| 2002/0106019 A1 | 8/2002 | Chaddha et al. | |
| 2003/0053543 A1 | 3/2003 | Bhaumik et al. | |
| 2003/0108102 A1 | 6/2003 | Demos | |
| 2004/0052263 A1 * | 3/2004 | Xu | 370/399 |
| 2004/0131121 A1 | 7/2004 | Dumitras et al. | |
| 2004/0170198 A1 * | 9/2004 | Meggers et al. | 370/514 |
| 2005/0002453 A1 | 1/2005 | Chang et al. | |
| 2006/0053020 A1 | 3/2006 | Chen et al. | |
| 2006/0165168 A1 | 7/2006 | Boyce et al. | |
| 2006/0165170 A1 | 7/2006 | Kim et al. | |
| 2006/0182027 A1 | 8/2006 | Conte et al. | |
| 2006/0215766 A1 | 9/2006 | Wang et al. | |
| 2006/0256857 A1 | 11/2006 | Chin | |
| 2006/0285594 A1 | 12/2006 | Kim et al. | |
| 2007/0076608 A1 * | 4/2007 | Samuel et al. | 370/230 |
| 2007/0116126 A1 | 5/2007 | Haskell et al. | |
| 2007/0127579 A1 | 6/2007 | Dumitras et al. | |
| 2007/0140352 A1 | 6/2007 | Bhaskaran et al. | |
| 2008/0062322 A1 | 3/2008 | Dey et al. | |
| 2008/0137753 A1 | 6/2008 | He | |
| 2008/0232466 A1 | 9/2008 | Farber et al. | |
| 2008/0240252 A1 | 10/2008 | He | |
| 2009/0219992 A1 * | 9/2009 | Wang | 375/240.03 |
| 2009/0252049 A1 * | 10/2009 | Ludwig et al. | 370/252 |
| 2009/0274094 A1 * | 11/2009 | Engwer | 370/328 |

* cited by examiner

VIDEO STREAM ADMISSION

PRIORITY INFORMATION

The present application claims the benefit under USC 119(e) of U.S. provisional patent application 61/164,534, titled: "Video Stream Admission", filed Mar. 30, 2009, the disclosure of which is incorporated herein by reference in its entirety. The present application is also a continuation in part (CIP) of U.S. patent application Ser. No. 12/152,814, published as US patent publication 2009-0052540, titled "Quality Based Video Encoding", the disclosure of which is incorporated herein by reference in its entirety.

FIELD OF THE INVENTION

The present invention relates to communication systems and in particular to systems for the delivery of video signals.

BACKGROUND OF THE INVENTION

Telecommunication channels are used to deliver various types of signals, including, data, audio and video signals, which are provided in what is generally referred to as communication connections. Each channel has a capacity which is the amount of data it can carry during a given period. A service resource monitor (SRM) generally determines which connections are admitted to the channel, in a manner which prevents overloading of the channel. This task is relatively easy when dealing with connections which have a fixed bit rate. But when a connection has a variable bit rate (VBR), the admission task becomes more complex. To ensure that all data is transmitted to its intended recipient, it is possible to allocate to each connection a bandwidth amount required for its largest data throughput over time, but such an allocation may be very wasteful. Accordingly, there have been suggestions to use statistical measures for voice connections which do not vary substantially over time. One such suggestion for voice calls appears in U.S. Pat. No. 7,369,490 to Azami et al., titled: "Method and Apparatus for Call Event Processing in a Multiple Processor Call Processing System", the disclosure of which is incorporated herein by reference.

The handling of VBR video is traditionally more complex than handling varying audio signals and therefore nearly all implemented video communication systems use constant bit rate (CBR) video streams. It is noted, however, that for a given quality level, some video frames, such as those having a large amount of detail, can be compressed only to a small extent, while other video frames (e.g., frames merely showing a blue sky) can be compressed to a larger extent. Therefore, many video compression methods provide variable bit-rate (VBR) video streams, in which different frames are compressed by different amounts.

US patent publication 2006/0182027 to Conte et al., titled: "Method and Apparatus for Controlling Data Flows in Telecommunications Network", the disclosure of which is incorporated herein by reference, describes a measure for representing the size of video streams, for use in admission decisions.

U.S. Pat. No. 6,269,078 to Lakshman et al., titled: "Method and Apparatus for supporting Compressed Video with Explicit Rate Congestion Control", the disclosure of which is incorporated herein by reference, describes a method of delivering video and allocation of bandwidth.

U.S. Pat. No. 7,149,185 to Suni, titled: "Measurement based connection Admission Control (MBAC) Device for a Packet Data Network", the disclosure of which is incorporated herein by reference, describes an admission method based on an estimation of an envelope of the video stream, for an asynchronous transfer mode (ATM) network.

U.S. Pat. No. 5,335,222 to Kamoi et al., titled: "Traffic Control System for Asynchronous Transfer Mode Exchange", the disclosure of which is incorporated herein by reference, describes another admission method.

PCT publication WO 00/38378 to Meyer et al., titled: Admission Control of Mixed VBR Sources in Broadband Networks", the disclosure of which is incorporated herein by reference, describes another admission method for VBR traffic.

U.S. Pat. No. 5,848,057 to Lee et al., titled: "Apparatus for Estimating Variable Bit Rate (VBR) Video Traffic, and Method Therefor", the disclosure of which is incorporated herein by reference, describes another bandwidth estimation method.

The methods described in the above references are generally either relatively complex or do not provide sufficient bandwidth utilization efficiency.

SUMMARY OF THE INVENTION

An aspect of some embodiments of the present invention relates to a channel admission method for video streams which uses an average size of video streams over time together with a measure of variation, such as the standard deviation or variance, to determine for a plurality of video streams whether they can be handled together by a channel of a given capacity.

There is therefore provided in accordance with an exemplary embodiment of the invention, a video stream admission method, comprising receiving one or more parameters of a video stream, indicative of a required bandwidth for the video stream, in a plurality of different quality levels; and determining based on the received one or more parameters, whether a channel can meet a predetermined condition for each of the plurality of quality levels, according to an available bandwidth of the channel.

Optionally, receiving the one or more parameters comprises receiving a specific parameter which is a function of the size of the video stream for a plurality of quality levels. Optionally, receiving the one or more parameters comprises receiving a specific parameter which is determined as the higher of an average bit rate of a high quality and a maximal bit rate over time of a lower quality. Optionally, receiving the one or more parameters comprises receiving one or more parameters of the same type for each of a plurality of quality levels.

Optionally, receiving the one or more parameters comprises receiving for each quality level a magnitude measure and a parameter indicative of a range around the magnitude measure. Optionally, receiving the one or more parameters comprises receiving for each quality level an average bit rate and a parameter indicative of a range around the average. Optionally, determining whether a channel can meet a predetermined condition for each of the plurality of quality levels comprises determining separately for each of the quality levels. Optionally, determining whether a channel can meet a predetermined condition for each of the plurality of quality levels comprises determining whether the channel capacity can accommodate a plurality of video streams based on their average bandwidth requirements and their deviations from their averages.

Optionally, determining whether a channel can meet a predetermined condition for each of the plurality of quality levels comprises determining whether the difference between the capacity of the channel and the sum of the average bandwidths required by the video streams for a specific quality level is greater than a safety margin which is a function of the standard deviations of the video streams for the specific quality level.

There is further provided in accordance with an exemplary embodiment of the invention, a video stream admission method, comprising determining for a plurality of currently handled video streams passing through a specific channel, an average size and a measure of the variation of the size around the average, receiving for a candidate video stream, an average size and a measure of the variation of the size around the average; and determining whether the specific channel can carry the plurality of currently handled video streams and the candidate video stream for at least a predetermined percentage of time, based on the average sizes of the video streams and the variations of the sizes.

Optionally, determining the averages and the measures of variation comprise receiving the averages and measures of variation for each video stream, with the video stream.

Optionally, the predetermined percentage of time comprises at least 97%.

Optionally, the average and variation measures are provided for a single quality level of each video stream. Optionally, the average and variation measures are provided for a plurality of quality levels for each video stream and the determination of whether the channel can carry the video streams is performed separately for each quality level with a different percentage.

Optionally, the variation measure comprises a standard deviation.

There is further provided in accordance with an exemplary embodiment of the invention, a video stream admission determination unit, comprising an input interface which receives one or more parameters of a video stream, indicative of a required bandwidth for the video stream, in a plurality of different quality levels and a processor configured to determine based on the received one or more parameters, whether a channel can meet a predetermined condition for each of the plurality of quality levels, according to an available bandwidth of the channel.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Overview

Figure 1:
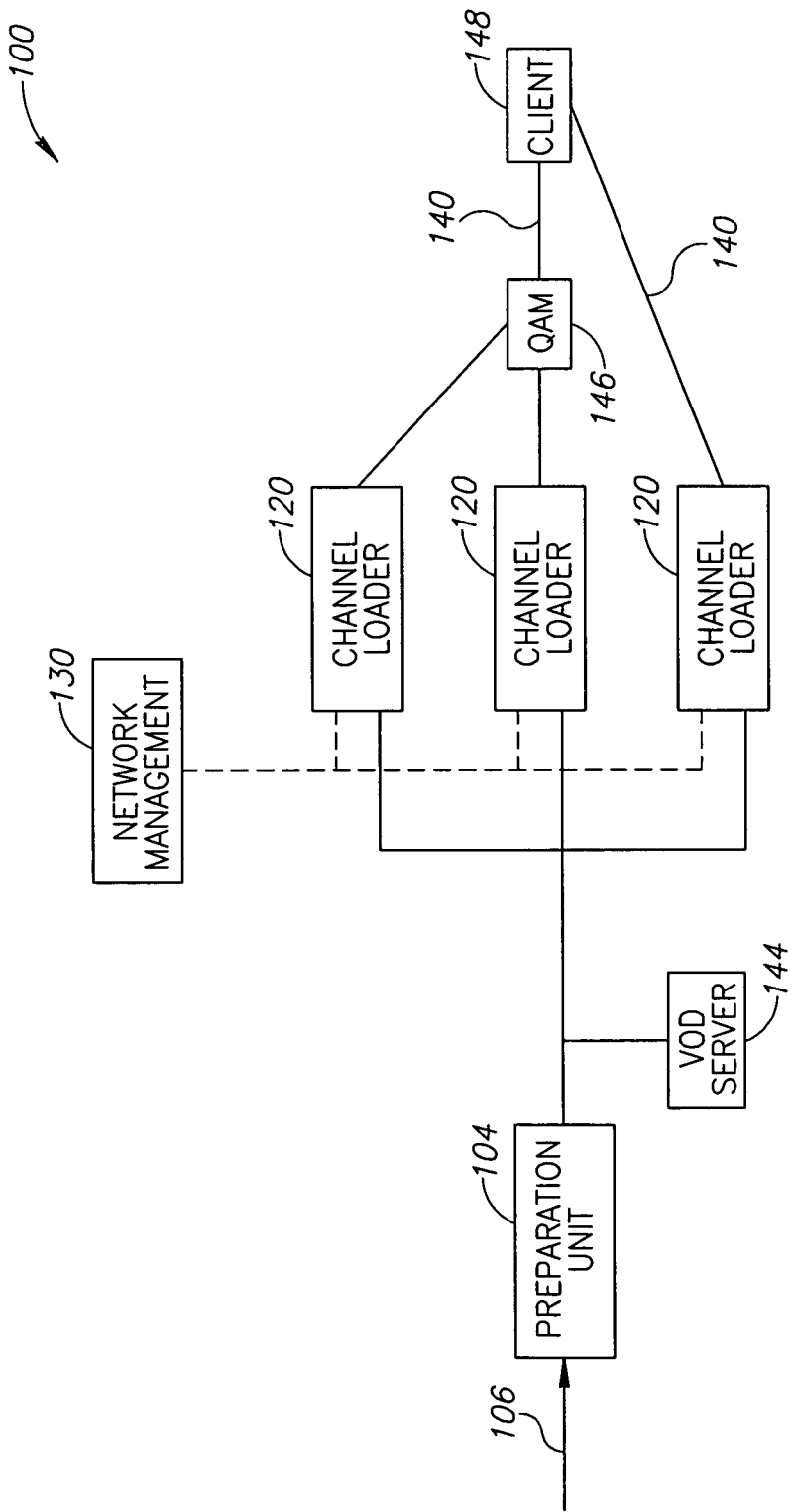
FIG. 1 is a schematic block diagram of a two part compression system, in accordance with an exemplary embodiment of the invention.

FIG. 1 is a schematic block diagram of a video delivery system 100, in accordance with an exemplary embodiment of the invention. Video delivery system 100 comprises channel loaders 120 which provide clients 148 with video streams they request. Optionally, a video on demand (VoD) server 144 stores video streams and provides them to channel loaders 120 upon requests. The video streams may be provided to clients 148 directly from channel loaders 120 or may be delivered through a quadrature amplitude modulation (QAM) tuner 146, or other appropriate mediation unit.

Channel loaders 120 may perform one or more statistical multiplexing tasks and/or may perform block replacement or selection tasks in fitting the video stream into available bandwidth on the connection 140 to the client 148, for example using any of the methods described in US patent publication 2006/0195881, titled Distributed Statistical Multiplexing of Multimedia", U.S. patent application Ser. No. 12/217,836, titled: "Distributed Transcoding", U.S. patent application Ser. No. 12/221,975 titled "Constant Bit Rate Video Stream" or US patent publication 2009/0052540, titled "Quality Based Video Encoding", the disclosures of all of which are incorporated herein by reference in their entirety. In some embodiments, channel loaders 120 may perform size adjustment of video streams based on compression instructions received with the video stream. In these and/or other embodiments, channel loaders 120 may perform block discarding when necessary to meet bandwidth constraints.

A network management unit 130 optionally manages routing of streams to clients in a manner which maximizes the video image quality, when multiple optional communication channels are available, for example when multiple QAMs 146 can be used to service a specific client 148. Network management unit 130 may also handle billing and/or other network tasks. In some embodiments, network management unit 130 performs request admission, deciding whether a channel loader 120 is to handle a new request or not, depending on the number of requests already handled and their properties. Alternatively, the request admission decisions are performed by the channel loaders 120.

In some embodiments of the invention, video delivery system 100 comprises a preparation unit 104 adapted to encode video streams received on an input line 106, typically for storage in VoD server 144. Alternatively or additionally, preparation unit 104 assigns size measures to the video streams, for use by network management unit 130 and/or channel loaders 120 in admission decisions.

System 100 may be used for real time video streams or for prestored video streams, for example in video on demand (VoD) services. When handling real time video streams, channel loader 120 generally processes the video stream a short time (for example less than 1 minute or even less than five seconds) after it is handled by preparation unit 104. In non-real-time embodiments, the handling by preparation unit 104 may be performed more than an hour, more than a day or even more than a week before the handling by channel loader 120.

Clients 148 may be any suitable device for receiving video, including television sets, computers and cellular phones. Communication channel 140 may be configured in a wide variety of ways and may be of various technologies including a cable or satellite connection, a packet based (e.g., Internet) connection, a wireless connection or other connections suitable for video delivery. Communication channel 140 may be dedicated solely for video delivery or may be used for various communication tasks.

Admission Decisions

Figure 2:
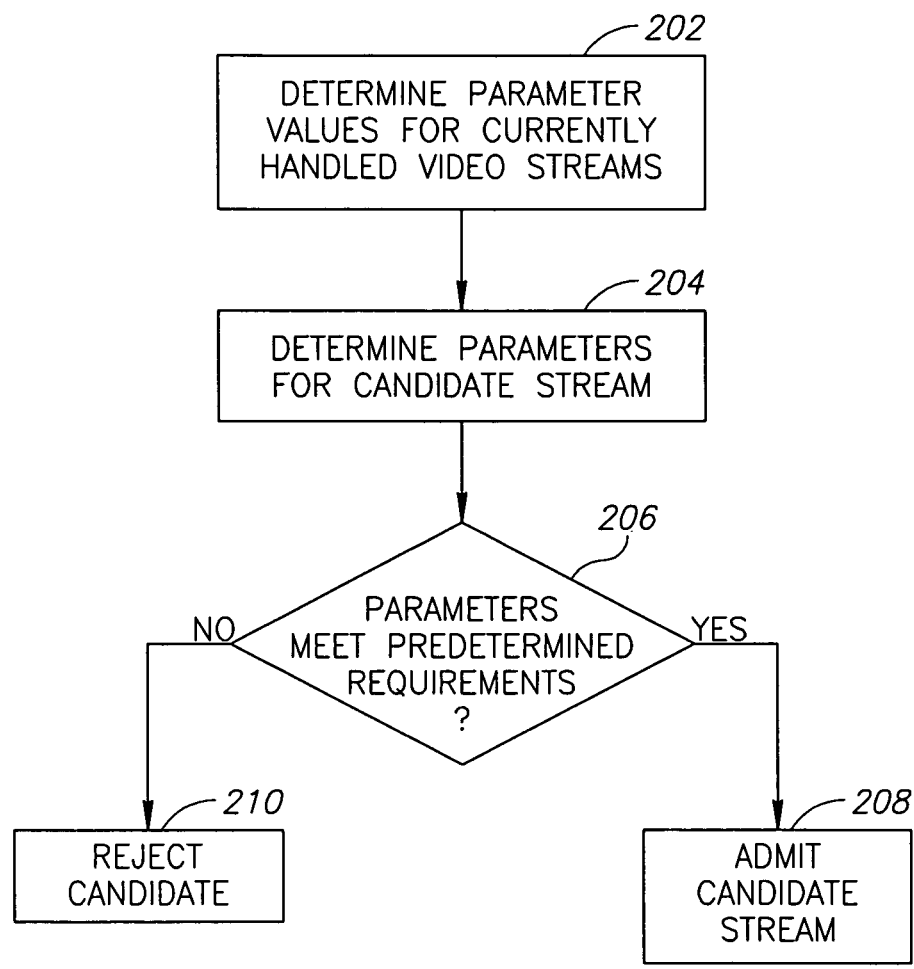
FIG. 2 is a flowchart of a method of video stream admission, in accordance with an exemplary embodiment of the invention.

FIG. 2 is a flowchart of an admission method for determining whether to accept a request to provide a candidate video stream, in accordance with an exemplary embodiment of the invention. For each video stream handled by channel loader 120, one or more parameters of the bandwidth required for the video stream are managed (202). The parameters are optionally managed for each video stream, and represent the bandwidth required for each of a plurality of quality levels of the video stream. In a similar manner, the one or more parameters are determined (204) for the candidate video stream. The parameters of the currently handled video streams and the candidate video stream are compared (206) to predetermined requirements relating to one or more quality levels and based on the available bandwidth, to determine whether the available bandwidth can handle the currently handled video streams, with the candidate video stream, while still meeting the predetermined requirements. If (206) the requirements are met, the candidate video stream is admitted (208) for handling. Otherwise, the request for the video stream is rejected (210).

In some embodiments, the parameter values are determined in advance for each video stream, for example by preparation unit 104, and are provided together with the request for admitting the video stream. Optionally, for video streams received without parameters, channel loader 120 determines the parameters on its own, or assigns default values.

Parameters

In some embodiments of the invention, the parameters of each video stream comprise values for a plurality of different quality levels. Optionally, the parameters include the average bandwidths of the video stream at a plurality of different quality levels. Optionally, the parameters additionally include for each quality level one or more values which represent the bandwidth variation of the video stream around the average over time, such as the variance over time and/or the standard deviation over time. Optionally, the predetermined requirements require that at any given time the chances that there will be sufficient bandwidth for delivery of the video stream are above a required predetermined threshold, for each quality level.

In an exemplary embodiment of the invention, in which the requirements for all the video streams are the same, the determination of whether the predetermined requirements are met is performed once, on an aggregation of the parameters for the different video streams. For each quality level i=1, 2, 3 ... n, an average bit rate $\mu_i(x)$ of the stream x at the quality level and a corresponding standard deviation $\sigma_i(x)$, are provided. The averages $\mu_i(x)$ and standard deviations $\sigma_i(x)$ of the streams to be provided together are summed to provide a combined average $M_i=\Sigma\mu_i(x)$ and a combined standard deviation $S_i=\Sigma\sigma_i(x)$. For each quality level, the normal distribution function for the channel size is determined and is compared to a threshold probability for the quality level:

$$\text{Normal\_distribution (Channel size, } M_i, S_i) \geq \text{Probability threshold}_i$$

In this manner, a more even quality distribution is facilitated for the video streams handled.

The channel size depends on the specific network environment and may be, for example, 38.8 Mbytes. In one example, parameter values are provided for two quality levels (e.g., 96% and 90%), and the probability threshold for the higher quality level (q1) is 99%, while the probability threshold for the lower quality level (q2) is 99.999%. In another embodiment, three quality levels are provided, q1 corresponding to a threshold of 80%, q2 corresponding to a threshold of 95% and q3 corresponding to a threshold of 99.9%. Naturally, the threshold probability for the higher quality is lower than for lower qualities, as otherwise the lower quality is not required.

Alternatively to using the same quality requirement for all the video streams passing through a single route, each video stream may be associated with its own requirements. Optionally, for each video stream, the channel size required to ensure that the video stream will have its respective probability thresholds for each of its quality levels, is determined. The sum of the determined channel sizes is then compared to the available bandwidth. In some embodiments of the invention, a more complex scheme is used, in order to take into account the gain from multiplexing the video streams together. In an exemplary embodiment of the invention, the averages and corresponding standard deviations are required to meet the following condition:

$$M_i + \text{Const}*\text{Sqrt}(\Sigma\sigma_i^2(x)) \leq \text{Channel Size}$$

where Const is a safety margin set as a compromise between achieving maximal channel utilization and avoiding overflow. In an exemplary embodiment, Const is between 2-4, for example 3.

In the above example, each video stream is associated with two parameters for each quality level. If only two quality levels are used, the size of each video stream may be represented by no more than four scalar values. It will be appreciated that using relatively few parameters simplifies the admission determination process.

In some embodiments, the number of parameters is further reduced and one or more simple values are used to represent the requirements of two quality levels. Optionally, a simple size measure is based on a maximal data unit size of the video stream at a low quality level (e.g., 90%), referred to herein as X1 and on the average data unit size of the video stream at a high quality level (e.g., 96%), referred to herein as X2. In an exemplary embodiment of the invention, the simple size measure is the larger of X1 and X2. Channel loader 120 preferably accepts a request to provide a video stream, only if there is available bandwidth of at least the simple size measure. Using such a policy guarantees that the video stream will be provided at least at the low quality level, and usually at the high quality level. The simple size measure may be accompanied by a parameter indicative of the extent of variation in the size of the video stream at the higher quality, around the simple size measure. It is noted, however, that the variation is not necessarily distributed evenly around the simple size measure. Alternatively or additionally, rather than setting X2 to be exactly the average, X2 may be set higher, for example to the average plus a constant weight times the variance, to increase the time percentage during which the video stream will be delivered at the higher quality.

Further alternatively or additionally, the simple size measure is a weighted average of an average size of the low quality level and the average size of the high quality level, with the weight of the low quality level being equal to the percentage for which the low quality level is tolerated.

In some embodiments of the invention, the admission decision is based on a parameter, or parameters, for a single quality level.

Admission Conditions

In some embodiments of the invention, the request to handle a video stream is provided with an indication of the requirements on the quality levels (e.g., the probability thresholds). Alternatively, a network manager defines the requirements on the quality levels. In some embodiments of the invention, the minimal allowed quality level is a function of one or more attributes of the specific video stream and/or of the specific client receiving the stream.

Some implementations involve adjustment of the requirements based on feedback from encoders 120 on the proportion of time in which low level video was provided. In some embodiments of the invention, when video streams supplied by system 100 suffer from a low quality level for more than a predetermined percentage of time, the admission requirements are made more rigorous, to make admission harder and hence raise the quality of provided video.

Utilization

In some embodiments, the method of FIG. 2 is performed by channel loader 120 or by any other unit which is to handle the video stream, such as a switch and/or a router. Alternatively, the method of FIG. 2 is performed by a control unit in network 100, such as a service resource monitor (SRM) of network management unit 130, which performs the admission decision for the channel loader 120 which is assigned to handle the connection. In some embodiments of the invention, the determination includes selecting a device to provide a video stream and/or a route for a video stream. For example, the admission determination may be performed for a plurality of routes until a suitable route is found. Alternatively or additionally, the admission determination may be performed for a plurality of routes and the route with the best results, for example, the lowest deviation from the predetermined requirements, is selected.

For non-real time video streams, the simple size measure is optionally determined in advance, based on the contents of the entire video stream. For real time streams, on the other hand, the simple size measure is optionally determined on the fly, based on the portion of the video stream already viewed.

The admission methods described above may be used in various systems. These admission methods may be used, for example, in systems which provide replacement blocks, in systems in which recompression is performed and/or in systems where frame discarding is performed to accommodate for momentary lack of bandwidth. The admission may be used, for example, in guaranteeing bandwidth in a packet based (e.g., IP, ATM) network, such that the video stream will be delivered over the network at a desired quality of service.

The quality levels may be levels at which the video streams have constant quality levels or may be levels at which the video stream has different average sizes, not necessarily with constant quality levels.

CONCLUSION

It will be appreciated that the above described methods may be varied in many ways, such as changing the order of steps, and/or performing a plurality of steps concurrently. It will also be appreciated that the above described description of methods and apparatus are to be interpreted as including apparatus for carrying out the methods and methods of using the apparatus. The units of system 100 may be implemented in hardware, firmware, software or combinations thereof. The present invention has been described using non-limiting detailed descriptions of embodiments thereof that are provided by way of example and are not intended to limit the scope of the invention. Many specific implementation details may be used.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe structure, acts or details of structures and acts that may not be essential to the invention and which are described as examples, for example in describing the best mode contemplated by the inventors. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

We claim:

1. A video stream admission method, comprising:
   receiving, by a processor, a single scalar parameter of a variable rate video stream, which single parameter is a function of a required bandwidth for the video stream, in a plurality of different quality levels and is a function of the higher of:
   (a) an average bit rate of the specific video stream at the first quality level; and
   (b) a maximal bit rate over time of the specific video stream at the second quality level;
   determining, by the processor, based on the received single scalar parameter, whether a channel can meet a predetermined condition on the quality of the video stream, according to an available bandwidth of the channel; and
   providing, by the processor, an instruction as to whether to admit the variable rate video stream to the channel, responsive to the determination of whether the channel can meet the predetermined condition.

2. The method according to claim 1, wherein receiving the single scalar parameter comprises receiving a specific scalar parameter which is determined as the higher of an average bit rate of a high quality and a maximal bit rate over time of a lower quality.

3. A video stream admission determination unit, comprising:
   an input interface which receives a single scalar parameter of a video stream, which is a function of a required bandwidth for the video stream, in a plurality of different quality levels, wherein the single scalar parameter is a function of the higher of:
   (a) an average bit rate of the specific video stream at the first quality level; and
   (b) a maximal bit rate over time of the specific video stream at the second quality level; and
   a processor configured to determine based on the received single scalar parameter, whether a channel can meet a predetermined condition on the quality of the video stream, according to an available bandwidth of the channel and to provide an instruction as to whether to admit the video stream to the channel, responsive to the determination of whether the channel can meet the predetermined condition.

4. The unit of claim 3, wherein the single scalar parameter is calculated as the higher of a plurality of size parameters of the stream corresponding to a plurality of different quality levels.

5. The unit of claim 3, wherein the single scalar parameter is calculated as the higher of an average bit rate of a high quality and a maximal bit rate over time of a lower quality.

6. The method of claim 1, wherein receiving the single parameter comprises receiving a specific parameter which is determined as the higher of a plurality of size parameters of the stream corresponding to a plurality of different quality levels.

7. A video stream admission method, comprising:
   determining a first measure of bandwidth required by a specific variable rate video stream, in a first quality level and a corresponding first required bandwidth;
   determining a second measure of bandwidth required by a specific video stream, in a second quality level and a corresponding second required bandwidth;

generating a single scalar parameter as a function of the first and second measures; and providing the single scalar parameter for admission determination of whether a channel can meet a predetermined condition on the quality of the specific variable rate video stream, according to an available bandwidth of the channel, wherein generating the single scalar parameter comprises generating a specific scalar parameter which is determined as a function of the higher of:

(a) an average bit rate of the specific video stream at the first quality level; and (b) a maximal bit rate over time of the specific video stream at the second quality level, such that a receiver of the scalar parameter can determine whether there is sufficient available bandwidth on the channel to admit the specific video stream.

* * * * *